United States Patent [19]

Staffanson

[11] 4,257,732
[45] Mar. 24, 1981

[54] HAY STACKER

[76] Inventor: Leroy Staffanson, Rte. 1, Box 192, Sidney, Mont. 59270

[21] Appl. No.: 59,150

[22] Filed: Jul. 20, 1979

[51] Int. Cl.³ .................. A01D 87/12; B66F 9/00
[52] U.S. Cl. ................ 414/703; 414/24.5; 414/685; 414/704; 280/423 R
[58] Field of Search .............. 414/24.5, 24.6, 25, 414/685, 686, 697, 702, 703, 704; 56/10.7, 474; 37/4, 117.5; 280/400, 423 R, 29

[56] References Cited

U.S. PATENT DOCUMENTS

| | | | |
|---|---|---|---|
| 2,298,256 | 10/1942 | Parus | 414/704 X |
| 2,468,220 | 4/1949 | McLendon | 37/4 |
| 2,606,417 | 8/1952 | Richey | 56/10.7 |
| 2,616,580 | 11/1952 | Olson | 414/685 |
| 2,671,570 | 3/1954 | Richey | 414/704 X |
| 2,738,083 | 3/1956 | Cadwell | 414/686 |
| 2,750,057 | 6/1956 | Stuart | 414/704 X |
| 2,815,876 | 12/1957 | Rogers | 414/686 |
| 3,288,316 | 11/1966 | West | 414/685 X |
| 3,525,447 | 8/1970 | Witikko | 414/704 |
| 3,756,624 | 9/1973 | Taylor | 280/423 R |

Primary Examiner—Stephen G. Kunin
Assistant Examiner—Terrance L. Siemens
Attorney, Agent, or Firm—Saidman & Sterne

[57] ABSTRACT

An agricultural implement, such as a hay rake, may be easily and quickly connected to or disconnected from the tow bar of a tractor. The apparatus features a large main frame assembly which extends over top of the tractor to a ground-engaging position in front of the tractor. The hay basket or other implement is connected to an end of an auxiliary lift frame which is pivotally coupled to the main frame by a hydraulic lift cylinder which permits the implement to be raised from its normal, ground-engaging position to a position far above the top of the tractor for unloading or transport. A second, lift cylinder controls the level of the implement during lifting and transport, while a third hydraulic cylinder serves to operate a push-off mechanism for unloading the hay rake. The apparatus also features a quick-connect-disconnect hitch for coupling to the draw bar of the tractor, and an integrally formed stand for supporting the main frame when uncoupled from the tractor.

25 Claims, 14 Drawing Figures

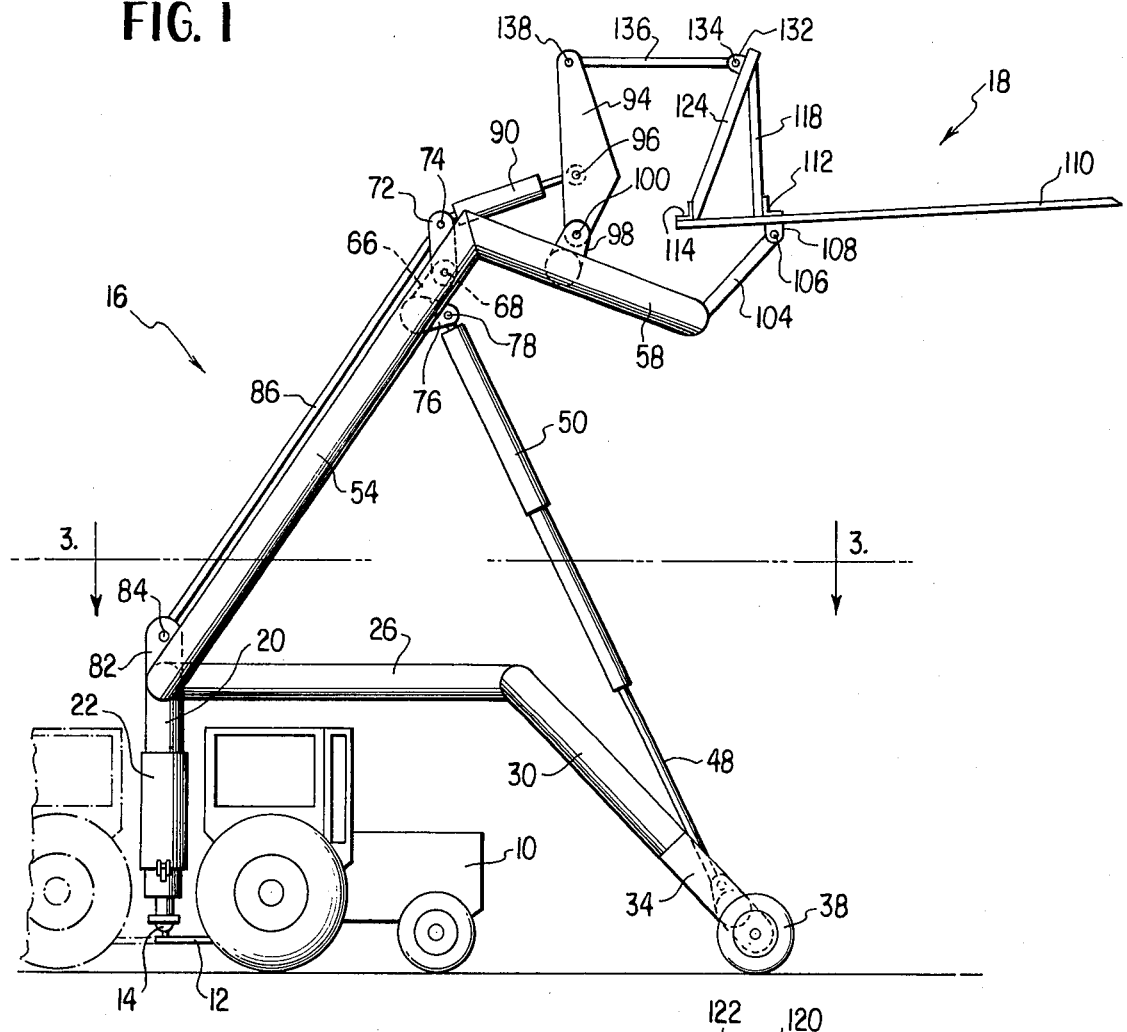
FIG. 1
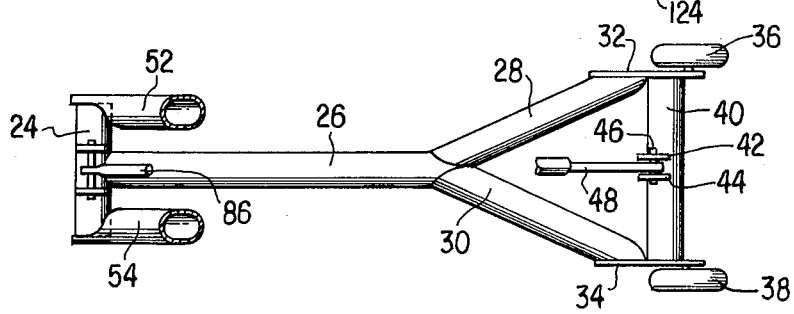
FIG. 2
FIG. 3

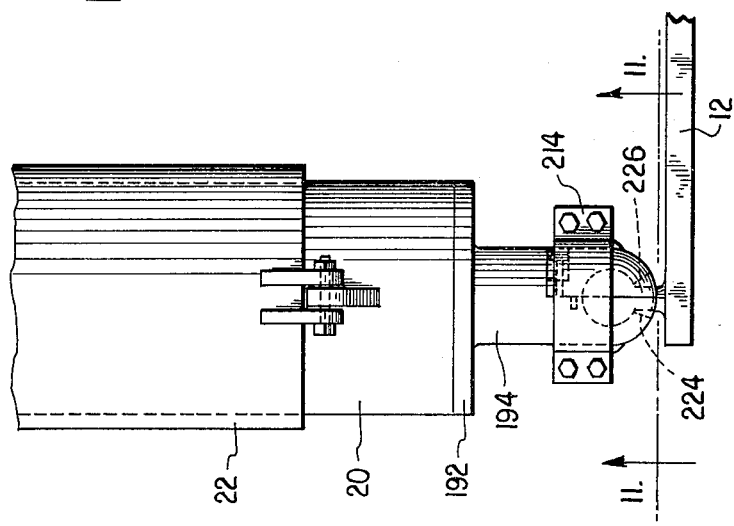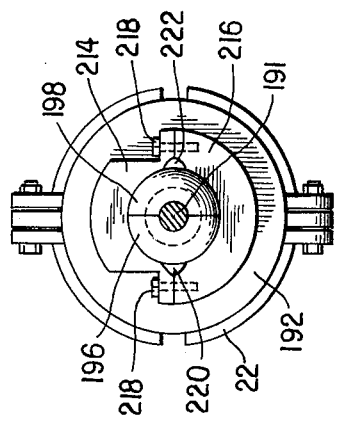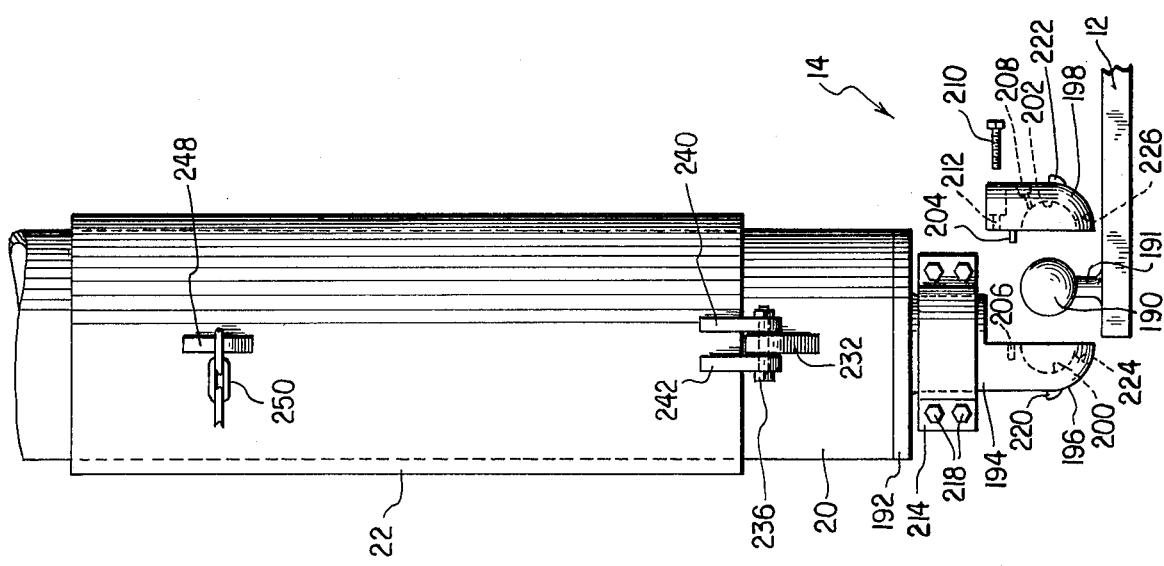

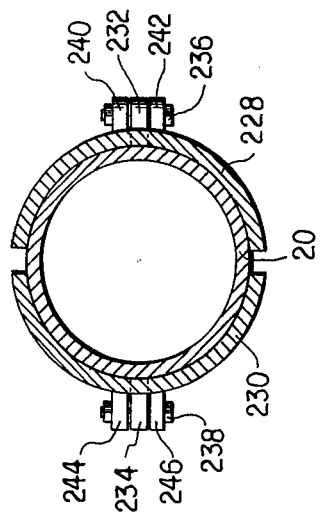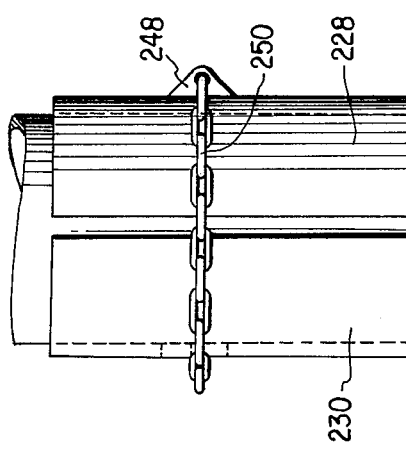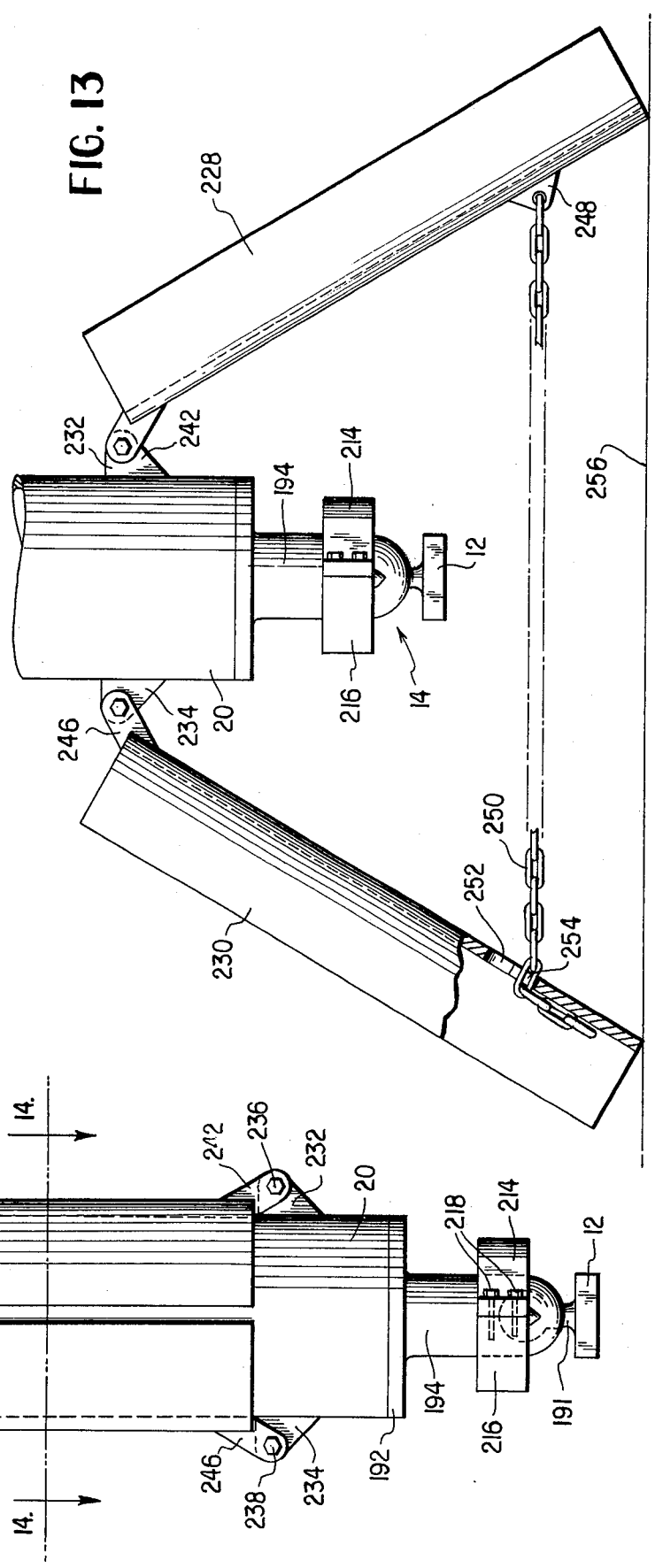

HAY STACKER

BACKGROUND OF THE INVENTION

1. Field of the Invention

The present invention is related to agricultural equipment and, more particularly, is directed toward a frame structure which may be utilized to couple an agricultural implement to a tractor.

2. Description of the Prior Art

It is known to provide several different types of hydraulically-operated frame assemblies for coupling an agricultural implement to a tractor. See, for example, the following U.S. Pat. Nos.: 2,468,220; 2,606,417; 2,738,083; and 2,815,876.

Of the foregoing, the Ritchie U.S. Pat. No. (2,606,417) teaches a rake assembly 39 connected to a tractor 21 by means of a wheeled frame 30. Means are provided in the form of a hydraulic actuator 81 for applying rocking force to the rake assembly 39 so as to move the latter between its lower position indicated by full lines in FIG. 1 and an upper position indicated by broken lines. The arch-like frame 30 is of sufficient height to permit the tractor to pass freely thereunder. An alternate form of the apparatus illustrated in FIGS. 10 and 11 includes power-actuated means for unloading the rake assembly in the form of a second hydraulic actuator 111 and associated linkages.

While the Ritchie patent describes a very useful structure, it nevertheless suffers from several deficiencies. Initially, the rake assembly may be raised only a short distance above the ground which makes it difficult to unload the contents thereof onto, for example, a high stack of hay. Further, the relatively low height of the rake assembly can obstruct the vision of the driver of the tractor, which presents a potentially serious safety hazard. Further, the low level of the rake assembly during transport, as illustrated in FIG. 8, makes maneuvering somewhat difficult. When operating with large amounts of hay and large hay stacks, the foregoing problems are increased.

It would also be desirable to provide such a frame assembly with means for permitting a quick connection or disconnection thereof to the draw bar of the tractor. Auxiliary means should also be provided for supporting the frame assembly when uncoupled from the tractor.

It is toward remedying these deficiencies that the present invention is advanced.

OBJECTS OF THE INVENTION

It is therefore a primary object of the present invention to provide a frame assembly for connecting an agricultural implement, such as a hay rake, to a tractor which overcomes all of the deficiencies noted above with respect to the prior art devices.

Another object of the present invention is to provide a novel and unique frame assembly for connecting an implement, such as a hay rake, to a tractor which may be readily constructed with available components, and which offers greater versatility than prior art devices in that the apparatus may be utilized with higher stacks of hay than heretofore possible.

A further object of the present invention is to provide a frame assembly for connecting a hay rake to a tractor which includes means for permitting the load on the basket to be maintained level during transport, and which also includes means for facilitating unloading of the hay basket on top of a hay stack.

A further object of the present invention is to provide a frame assembly for a tractor to which any of a number of different agricultural implements may be attached, and which features a quick-connect-disconnect hitch assembly and an integrally formed support stand when the frame assembly is uncoupled from the tractor.

A still further object of the present invention is to provide a hay stacker which greatly facilitates gathering, transport and storage of hay or similar material.

SUMMARY OF THE INVENTION

The foregoing and other objects are attained in accordance with one aspect of the present invention through the provision of apparatus adapted to be connected to the draw bar of a tractor, which comprises an agricultural implement normally positioned to engage the ground, and a frame for supporting the implement and for connecting same to the draw bar of the tractor. The frame includes a post extending vertically from the draw bar to a position above the top of the tractor, a support frame extending forwardly from the post above the tractor and terminating in a ground-engaging wheel assembly positioned in front of the tractor, and means pivotally coupled between the post and the wheel assembly for lifting the implement from its ground-engaging position to a raised position well above the top of the tractor.

More particularly, the means pivotally coupled between the post and the wheel assembly comprises a lift frame assembly including auxiliary frame members having one end pivotally coupled to the post and extending forwardly above the tractor in the ground-engaging position and arms extending downwardly from the forward end of the auxiliary frame members, the ends of the arms being positioned adjacent the wheel assembly in the ground-engaging position. The lift frame more particularly comprises first hydraulic cylinder means having one end pivotally coupled to the wheel assembly and whose other end is pivotally coupled to the auxiliary frame members at a position near the forward end thereof for raising and lowering the lift frame assembly.

In accordance with another aspect of the present invention, means are also provided for pivotally coupling the implement to the arms of the lift frame assembly which also includes means for controlling the orientation of the implement with respect to the ground. The last-named means preferably comprises second hydraulic cylinder means pivotally coupled between the implement and the auxiliary frame members of the lift frame assembly.

In accordance with more specific aspects of the present invention, the means for pivotally coupling the implement to the arms of the lift frame assembly comprises first linkage means having one end rigidly connected to and extending forwardly from the ends of the arms and whose other end is pivotally mounted to the implement, second linkage means pivotally coupled at one end thereof to the arms of the lift frame assembly, and third linkage means pivotally coupled at one end thereof to the implement and at the other end thereof to the other end of the second linkage means, wherein the second hydraulic cylinder means is pivotally mounted to the second linkage means at a position intermediate the ends thereof.

In accordance with another aspect of the present invention, the vertical post includes a transverse frame member positioned at the top thereof and the support frame comprises a single frame member rigidly connected to the center portion of the transverse frame member, while the auxiliary frame members include two frame members, one pivotally mounted to each end of the transverse member so as to be substantially coplanar with the single frame member when in the ground-engaging position. The support frame further comprises first and second support arms extending downwardly and rearwardly from the end of the single frame member, the wheel assembly being connected to the lower ends of the first and second support arms and including a second transverse frame member to the center of which is pivotally coupled the first hydraulic cylinder means. The other end of the first hydraulic cylinder means is pivotally coupled to the two frame members at a position intermediate the end of the single frame member and the forward end of the auxiliary frame member. The ends of the arms of the lift frame assembly are positioned adjacent the second transverse frame member in the ground-engaging position.

In accordance with another aspect of the present invention, the implement comprises means for gathering hay including a plurality of substantially parallel tines extending forwardly from a tine support frame, vertically oriented means normally disposed near the rear of the tines for serving as a backstop for gathered hay and means for moving the vertically oriented means along the tines for unloading the hay gathered thereon. The last-named means preferably comprises third hydraulic cylinder means substantially vertically oriented and pivotally coupled between the tine support frame and the backstop. The tine support frame more particularly comprises first and second parallel, transverse frame means connected across the tines near the rear portions thereof, vertical frame means extending upwardly from the first transverse support means, diagonal frame means extending from the second transverse frame means, and upper transverse frame means connecting the tops of the vertical frame means and the diagonal frame means. A U-shaped linkage means is preferably pivotally coupled at one end thereof to the upper transverse frame means and at the other end thereof to the third hydraulic cylinder means.

The means for moving the vertical frame means further comprises a pair of laterally spaced struts rigidly connected to and depending from the other end of the U-shaped linkage means, and a pair of V-shaped rods extending rearwardly from the backstop and pivotally mounted at their respective apexes to the pair of struts whereby actuation of the third hydraulic cylinder means causes lateral movement of the backstop along the tines.

In accordance with another aspect of the present invention, there is further provided quick-connect-disconnect ball joint means for coupling the post to the draw bar. The last-named means more particularly may comprise a ball connected to and extending upwardly from the draw bar, separable means extending downwardly from the post and defining a recess for receiving the ball therewithin and means selectively positionable about the separate means for maintaining same together. The separable means may include first and second bracket halves, each having a substantially semi-spherical recess for receiving the ball and a projection on the outer surface thereof for limiting downward movement of the selectively positionable means. The first bracket half is preferably integrally formed with the separable means extending downwardly from the post, while the second bracket half may include a grease fitting for allowing lubrication of the ball and means for facilitating separation of the halves during uncoupling. The selectively positionable means preferably comprises a split ring adapted to move vertically along the separable means.

In accordance with yet another aspect of the present invention, there is further provided means connected to the post for supporting same on the ground when the frame is uncoupled from the tractor. Said supporting means comprises a pair of semi-cylindrical sleeves each pivotally mounted at the lower ends thereof to the post and movable between a storage position concentric with the post and a ground-engaging position extending below the post. The sleeves also include means for retaining same in their storage position and their ground-engaging position. The retaining means may comprise a chain connected to one of the sleeves and means formed in the other sleeve for receiving an end of the chain in the ground-engaging position.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side view of a preferred embodiment of the hay stacker of the present invention shown in its elevated position;

FIG. 2 is a top view of the preferred embodiment illustrated in FIG. 1;

FIG. 3 is a sectional view taken along line 3—3 of FIG. 1;

FIG. 9 is an enlarged, side view, partially exploded, illustrating a preferred embodiment of a quick-connect-disconnect hitch of the present invention;

FIG. 10 is a view similar to FIG. 9 but showing the apparatus in its assembled condition;

FIG. 11 is a cross-sectional view of the apparatus illustrated in FIG. 10 and taken along line 11—11 thereof;

FIG. 12 is a side view of the apparatus illustrated in FIG. 10 and showing the support stand of the present invention in its stored position;

FIG. 13 is a view similar to FIG. 12 but showing the support stand in its support position; and FIG. 14 is a cross-sectional view of the apparatus illustrated in FIG. 12 and taken along line 14—14 thereof.

DETAILED DESCRIPTION OF THE PREFERRED EMBODIMENT

Figure 4:
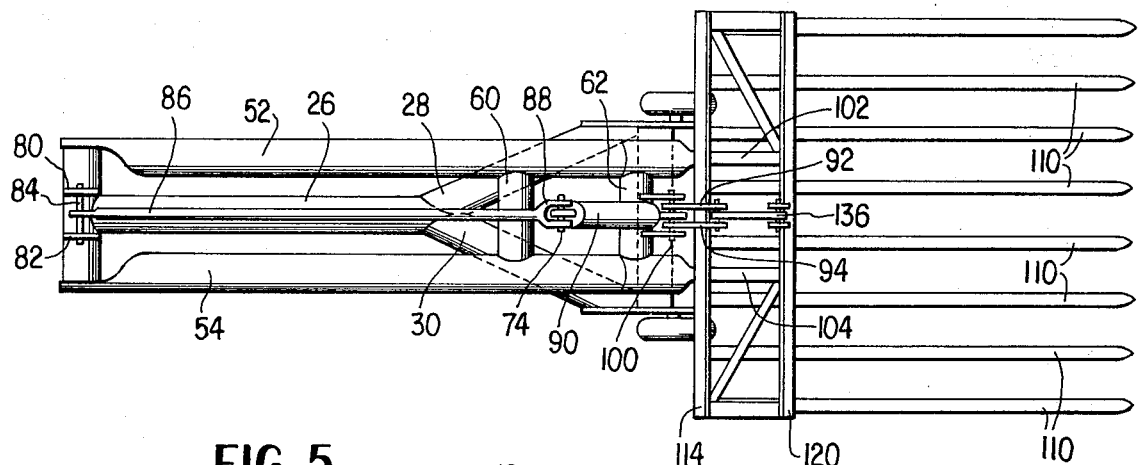
FIG. 4 is a top view of the preferred embodiment of the present invention in its lowered or ground-engaging position.
Figure 5:
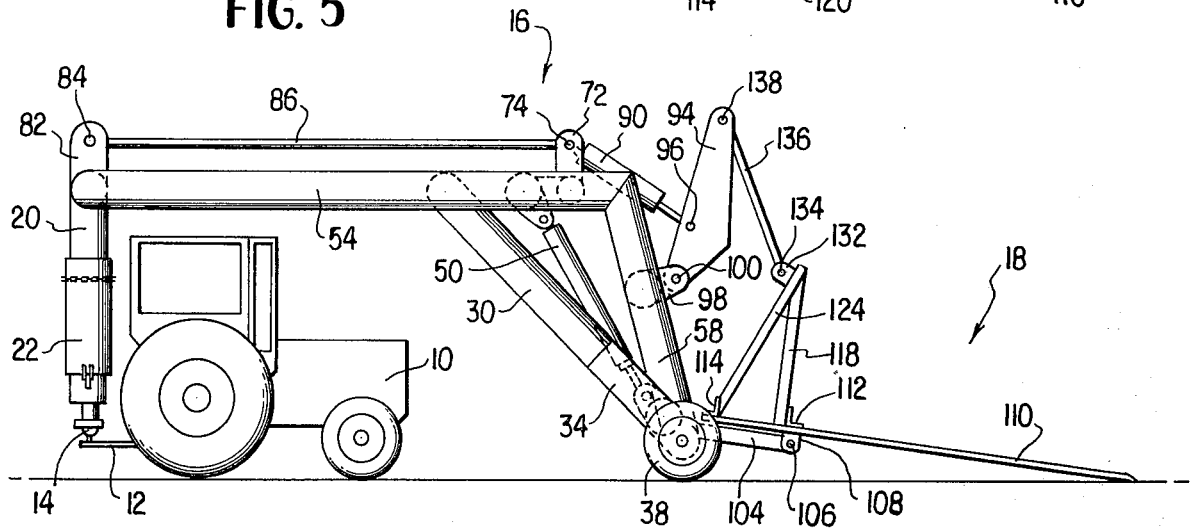
FIG. 5 is a side view of the present invention in its ground-engaging position.

Referring now to the drawings, wherein like reference numerals represent identical or corresponding parts throughout the several views and more particularly to FIGS. 1 through 5, the present invention is indicated generally by reference numeral 16 and is seen to comprise a frame structure which is illustrated in its raised position in FIG. 1 and in its lowered position in FIG. 5.

Frame structure 16 is coupled to a tractor 10 by means of its rearwardly extending draw bar 12 having a ball hitch 14, the details of construction of which will be described in greater detail hereinafter.

To the other extremity of frame structure 16 is connected a hay basket or rake which is indicated generally by reference numeral 18. While the preferred embodiment of the present invention will be described hereinafter in connection with operation of a hay basket or hay rake, it will be understood by a person of ordinary skill in the art that any suitable agricultural implement may be connected to the frame structure 16, such as a scoop, grapple fork, fork-lift tines, cement mixer, squeeze-fork for handling small baled hay stacks, or the like.

Frame structure 16 includes a vertical post 20 which extends from the ball hitch 14 of draw bar 12 upwardly behind tractor 10. Tractor 10 is adapted to rotate 360° about the vertical post 20 to lend great versatility to the present invention, as will be described in greater detail hereinafter.

Mounted about vertical post 20 just above ball hitch 14 is a stand 22, shown in FIGS. 1 and 5 in its retracted position, for supporting frame structure 16 when it is uncoupled from tractor 10, in a manner which will be described more fully below.

Connected to the top of vertical post 20 is a rear transverse frame member 24. Connected to rear transverse frame member 24 at its midpoint and extending forwardly is a horizontally positioned frame member 26 having a pair of diverging legs 28 and 30 (FIG. 3) extending angularly downwardly from the forwardmost end thereof. On the lower ends of legs 28 and 30 are mounted a pair of wheel support plates 32 and 34, respectively, having a pair of wheels 36 and 38 mounted thereto by conventional means.

Wheel support plates 32 and 34 are also connected and supported by a transverse brace 40 to the center of which are mounted a pair of flanges 42 and 44 which have a pivot pin 46 extending therethrough for pivotally supporting one end 48 of a hydraulic lift cylinder 50, the operation of which will be described in greater detail hereinafter.

Extending from the ends of rear transverse frame member 24 are a pair of substantially parallel lift frame members 52 and 54 which, in their lowered position (FIG. 5), extend horizontally a distance substantially beyond the end of frame member 26. Extending angularly downwardly from each end of lift frame members 52 and 54 are basket support members 56 and 58, respectively. Positioned near the junction of lift frame member 52 and basket support member 56, and lift frame member 54 and basket support member 58, and extending between lift frame members 52 and 54 is a forward transverse frame member 60, while a similar transverse frame member 62 extends between basket support members 56 and 58 near the mid-portions thereof.

As seen in FIG. 1, extending downwardly from transverse frame member 60 is a support plate 76 having a pivot pin 78 to which the upper end of hydraulic cylinder 50 is pivotally mounted. As shown in FIG. 2, a pair of support flanges 64 and 66 are also connected to transverse frame member 60 and extend parallel with lift frame members 52 and 54. Support flanges 64 and 66 are connected by a pivot pin 68 to which is also pivotally mounted a pair of linkages 70 and 72 connected by another pivot pin 74.

Extending upwardly from the rear transverse frame member 24 are a pair of support plates 80 and 82 through which is positioned a pivot pin 84. A rod linkage 86 is pivotally mounted between pivot pin 84 and pivot pin 74. The forward connection of rod linkage 86 to pivot pin 74 is preferably effected by a yoke 88 formed on the forward end of linkage 86.

Also pivotally mounted to pin 74 is one end of a hydraulic tilt cylinder 90. The other end of tilt cylinder 90 is generally mounted as at 96 between a pair of similar linkage plates 92 and 94.

Extending from the transverse frame member 62 are a pair of support plates 96 and 98 having a pivot pin 100 which pivotally connects plates 96 and 98 to one end of linkage plates 92 and 94.

As best seen in FIGS. 1 and 5, extending rigidly from the lower ends of basket support members 56 and 58 are a pair of basket support bars 102 and 104, respectively, which are pivotally mounted as at 106 to brackets 108 positioned on the underside of hay basket 18.

Hay basket or rake 18 broadly includes a plurality of tines 110 which extend forwardly and substantially parallel to one another. Tines 110 are coupled together at their rear end by a pair of transversely extending forward and rear angle irons 112 and 114. Extending vertically from forward angle iron 112 are vertical side supports 116 and 118 which are coupled at their top ends by an upper transverse frame member 120. Extending forwardly and upwardly from rear angle iron 114 are side supports 122 and 124. Diagonal braces 126 and 128 may also be provided as reinforcing structure. As will be described in greater detail hereinbelow, hay basket 18 may also include a push-off mechanism, the details of construction of which are not illustrated in FIGS. 1 through 5 for the sake of simplicity.

At the midpoint of upper transverse frame member 120 are positioned a pair of pivot plates 130 and 132 having a pin 134 for pivotally supporting one end of a linkage 136. The other end of linkage 136 is pivotally connected at 138 between linkage plates 92 and 94.

The operation of the apparatus thus far described will now be set forth. The apparatus is designed to gather, handle, move, lift and stack material, such as hay in a simple and efficient manner. With the tractor 10 positioned as illustrated in FIG. 5, and the hydraulic cylinder 50 in its retracted position so that lift members 52 and 54 are in their lowered position, the tines 110 of hay basket 18 are adapted to contact the ground and gather hay as the tractor 10 travels forwardly down the field (to the right as viewed in FIG. 5). When the hay basket 18 is full, tilt cylinder 90 is actuated slightly so as to lift the tines 110 off the ground through linkage plates 92 and 94 and linkage 136. Main lift cylinder 50 is then actuated slightly to raise lift frame members 52 and 54 and basket support members 56 and 58 so that basket 18 just clears the ground for transport. Alternatively, it may be desirable in certain instances to raise basket 18 to the position illustrated in FIG. 1 wherein hay basket 18 is lifted far above the top of tractor 10 for transport. While lift cylinder 50 is actuated, tilt cylinder 90 may be simultaneously actuated to to maintain hay basket 18 properly oriented with respect to the ground to avoid losing its load. Self-leveling arm 86 helps to keep the proper slant on teeth 110 as cylinder 50 is extended. Tractor 10 may then be moved 180° to its dotted line position illustrated in FIG. 1 to pull the hay basket 18 like a trailer to either a truck for unloading or to the stack yard. Upon reaching the desired position in the stack the cylinders 50 and 90 may again be actuated to raise or otherwise position tines 110 of basket 18 adjacent the top of the stack onto which the load of basket 18 is desired to be placed. An automatic push-off mechanism (not shown in FIGS. 1 through 5) may then be operated to dispose of the load on hay basket 18, whereafter the assembly may again be lowered, transported back into the field and used again to gather hay. For ease in illustration, the various hydraulic lines, pumps and controls are not shown in the drawings, since their inter-connection and operation would be apparent to a person of ordinary skill in the art.

Figure 6:
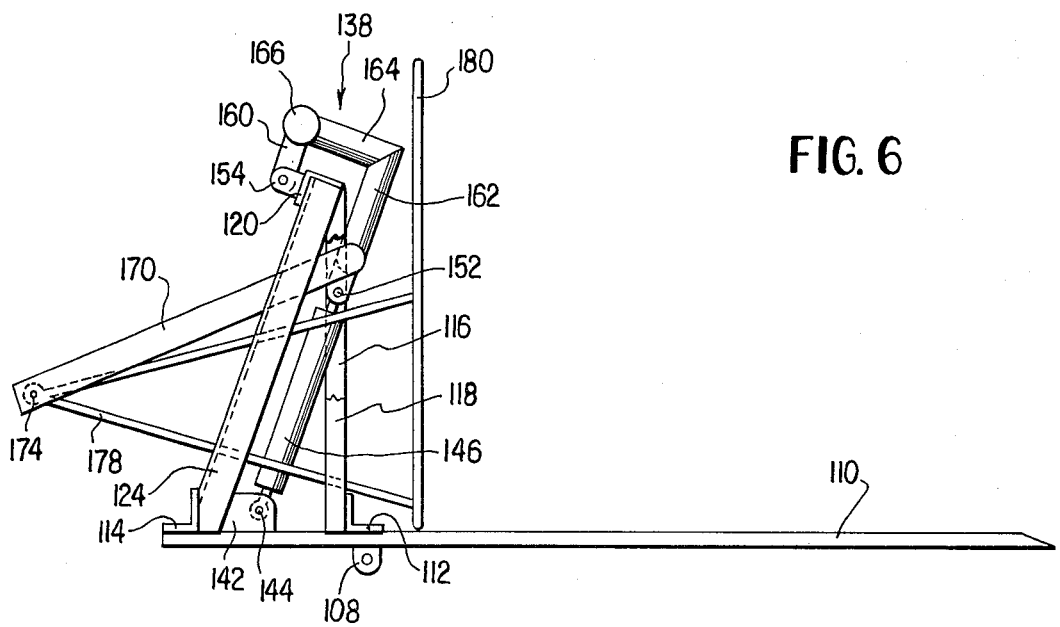
FIG. 6 is an enlarged, side view which illustrates a preferred embodiment of the hay rake which includes a push-off mechanism.
Figure 7:
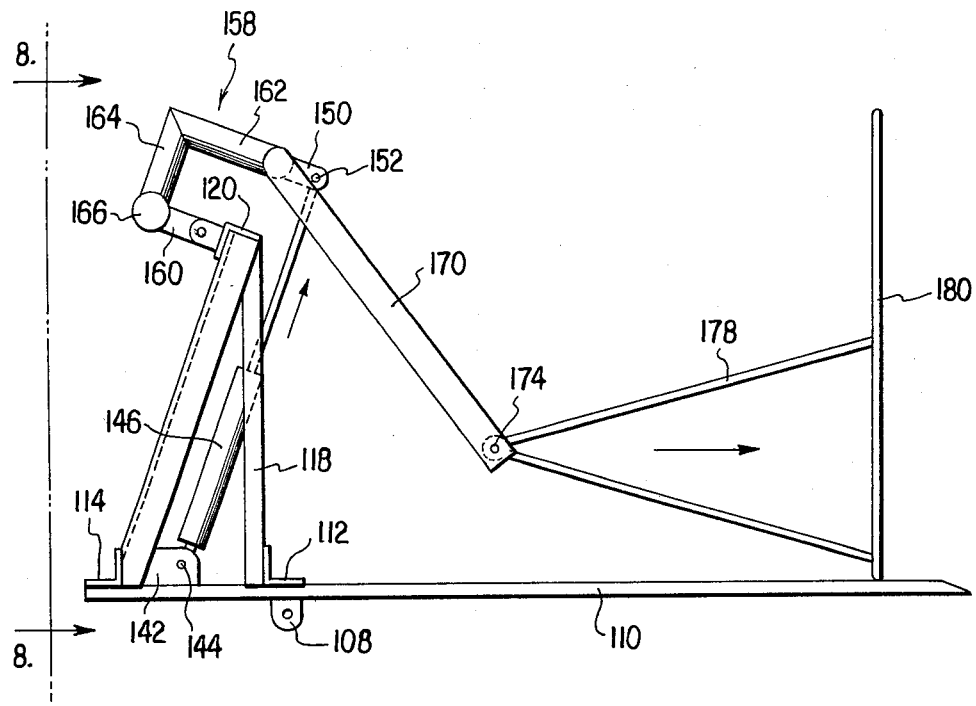
FIG. 7 is a side view of the apparatus illustrated in FIG. 6, but in another operative position thereof.
Figure 8:
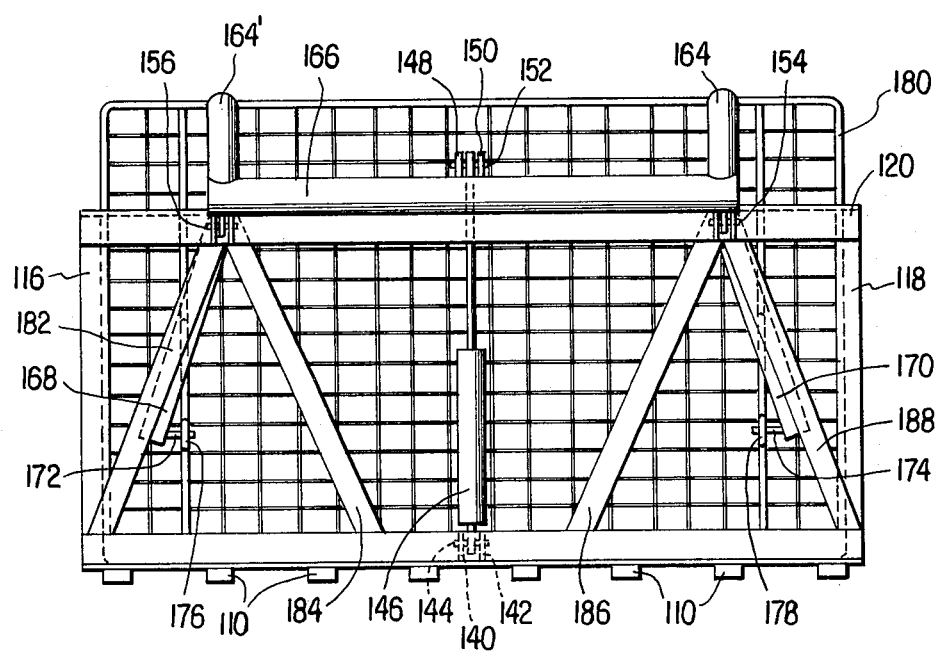
FIG. 8 is an end view of the apparatus illustrated in FIG. 7 and taken along line 8—8 thereof.

Referring now to FIGS. 6 through 8, the details of construction of hay basket 18 are illustrated. Hay basket 18 is seen to include a push-off mechanism which is indicated generally by reference numeral 138. A pair of support flanges 140 and 142 extend forwardly from the rear angle iron 114 and have a pivot pin 144 to which is pivotally connected one end of a push-off hydraulic cylinder 146. The other end of cylinder 146 is mounted between a pair of support flanges 148 and 150 by means of pivot pin 152.

The upper transverse frame member 120 includes a pair of spaced pivotal mounts 154 and 156 for pivotally connecting a U-shaped linkage 158 that includes parallel portions 160 and 162 and connecting portion 164. As shown in FIG. 8, a transverse support bar 166 connects portions 164 and 160.

Extending from the ends of portions 162 are struts 168 and 170 whose ends are pivotally connected as at 172 and 174 to V-shaped rods 176 and 178, respectively. Rods 176 and 178 are connected at their forward ends to a vertically oriented push-off screen 180. The frame structure of hay basket 18 may also include a plurality of diagonal braces 182, 184, 186 and 188.

The actuation of hydraulic cylinder 146 serves to move the screen 180 from its position illustrated in FIG. 6 to that illustrated in FIG. 7. The position of FIG. 6 is that utilized to gather the hay onto tines 110, and screen 180 therein serves as a backstop for the hay. Upon actuation of cylinder 146, screen 180, remaining substantially vertically oriented, travels along tines 110 to push the gathered hay off of the basket 18. The upward push of cylinder 146 causes the U-shaped linkage 158 to pivot counter-clockwise about pivot mounts 154 and 156 to bring struts 168 and 170, and hence rods 176 and 178 and screen 180, forwardly.

Referring now to FIGS. 9 through 11, there is illustrated details of construction of the quick hitch mechanism 14. The draw bar 12 of tractor 10 is seen to include a ball 190, approximately 3 inches in diameter, mounted on a ball shaft 191 extending from bar 12. A mounting plate 192 on the bottom of post 20 retains a shaft 194 which extends downwardly therefrom. Integrally formed with shaft 194 is one-half of a ball coupler 196 which is designed to mate with the separable other half 198.

Each ball coupler 196 and 198 includes semi-spherical recessed portions 200 and 202, respectively, which are adapted to fit around ball 190. Recessed portions 200 and 202 open downwardly via tapered openings 224 and 226, respectively, for fitting about ball shaft 191. Note that openings 224 and 226 are flared outwardly from recesses 200 and 202 to allow the tractor 10 and the frame assembly 16 to wobble independently when traversing rough terrain.

Coupler half 198 includes a pair of dowels 204 adapted to fit in dowel slots 206 formed in coupler 196. Half 198 further preferably includes a grease fitting 208 for permitting the ball 190 to be lubricated. A cap screw 210 extends through a bore 212 to bear against coupler half 196 for facilitating the separation of halves 196 and 198 when uncoupling. Screw 210 may be required to separate the coupler halves 196 and 198 due to the tight-fitting dowels 204.

Mounted about shaft 194 so as to be movable vertically therealong are split ring halves 214 and 216 which are secured by screws or bolts 218. Projections or lugs 220 and 222 are preferably formed on the outer surface of coupler halves 196 and 198 to limit the downward movement of split ring halves 214 and 216 to the position shown in FIG. 10.

The operation of the quick-hitch coupler 14 is believed clear from the drawings. To couple the post 20 to the draw bar 12, ball 190 is first placed within recess 200 of coupler 196. The other coupler half 198 is then securely positioned about the exposed half of ball 190 by fitting dowels 204 in slots 206. Split-ring halves 214 and 216 are then lowered to the position illustrated in FIG. 10 to secure the assembly. To uncouple same, halves 214 and 216 are raised along shaft 194, and screw 210 is projected against half 196 to separate half 198 therefrom.

Referring now to FIGS. 12 through 14, the support stand 22 of the present invention is illustrated in greater detail. Stand 22 is designed to support the frame structure 16 and attached hay basket 18 when uncoupled from the draw bar 12. Support stand 22 comprises a pair of semi-cylindrical sleeves 228 and 230 which are adapted to fit concentrically about post 20 in their stored position illustrated in FIGS. 12 and 14. Extending from post 20 are a pair of diametrically opposed pivot flanges 232 and 234 having pivot bolts 236 and 238 for pivotally mounting sleeves 228 and 230, respectively. Mounted on the lower portion of sleeve 228 are a pair of pivot flanges 240 and 242 for cooperating with pivot bolt 236, while a pair of like pivot flanges 244 and 246 extend from the lower end of sleeve 230 for pivotal mounting to bolt 238.

Near the top of sleeve 228 is mounted a flange 248 on the outer periphery of which is connected a chain 250 or similar device which, in the position illustrated in FIG. 12, is adapted to hold the sleeves 228 and 230 together about post 20.

In the position illustrated in FIG. 13, chain 250 has been removed from its sleeve retaining position of FIG. 12, and sleeves 228 and 230 have been pivoted about pins 236 and 238 to their ground-engaging position extending below shaft 194. An aperture 252 having a pin or key slot 254 is formed in the wall of sleeve 230 over which chain 250 may be connected to maintain the sleeves in their support or ground-engaging position over ground 256. After securing sleeves 228 and 230 in the position of FIG. 13, split ring halves 214 and 126 of quick-hitch mechanism 14 may be moved upwardly on shaft 194, and the ball 190 may then be decoupled, as described above.

Obviously, numerous modifications and variations of the present invention are possible in light of the above teachings. For example, the hitch ball can alternatively be placed on the front of the tractor. Further, moving the wheels 36 and 38 closer to the tractor 10 relative to the hay basket 18 would allow the front of the teeth 110 to be raised higher when the fork is down. It is therefore to be understood that within the scope of the appended claims, the invention may be practiced otherwise than as specifically described herein.

I claim as my Invention:

1. Apparatus adapted to be connected to the draw bar of a tractor, which comprises:
   an agricultural implement normally positioned to engage the ground; and
   a frame for supporting said implement and for connecting same to the draw bar of said tractor;
   wherein said frame includes:
      a post extending vertically from said draw bar to a position above the top of said tractor;
      a support frame extending forwardly from said post above said tractor and terminating in a ground-engaging wheel assembly positioned in front of said tractor; and
      means pivotally coupled between said post and said wheel assembly for lifting said implement from its ground-engaging position to a raised position well above the top of said tractor.

2. The apparatus as set forth in claim 1, wherein said means pivotally coupled between said post and said wheel assembly comprises a lift frame assembly including auxiliary frame members having one end pivotally coupled to said post and extending forwardly above said tractor in said ground-engaging position and arms extending downwardly from the forward end of said auxiliary frame members, the ends of said arms being positioned adjacent said wheel assembly in said ground-engaging position.

3. The apparatus as set forth in claim 2, wherein said lift frame further comprises first hydraulic cylinder means having one end pivotally coupled to said wheel assembly and whose other end is pivotally coupled to said auxiliary frame members at a position near said forward end thereof for raising and lowering said lift frame assembly.

4. The apparatus as set forth in claim 3, further comprising means for pivotally coupling said implement to said arms of said lift frame assembly.

5. The apparatus as set forth in claim 4, wherein said means for pivotally coupling said implement to said arms of said lift frame assembly includes means for controlling the orientation of said implement with respect to the ground.

6. The apparatus as set forth in claim 5, wherein said means for controlling the orientation of said implement comprises second hydraulic cylinder means pivotally coupled between said implement and said auxiliary frame members of said lift frame assembly.

7. The apparatus as set forth in claim 6, wherein said means for pivotally coupling said implement to said arms of said lift frame assembly comprises:
   first linkage means having one end rigidly connected to and extending forwardly from said ends of said arms and whose other end is pivotally mounted to said implement;
   second linkage means pivotally coupled at one end thereof to said arms of said lift frame assembly; and
   third linkage means pivotally coupled at one end thereof to said implement and at the other end thereof to the other end of said second linkage means;
   wherein said second hydraulic cylinder means is pivotally mounted to said second linkage means at a position intermediate said ends thereof.

8. The apparatus as set forth in claim 6, wherein said implement comprises means for gathering hay including:
   a plurality of substantially parallel tines extending forwardly from a tine support frame;
   vertically oriented means normally disposed near the rear of said tines for serving as a backstop for gathered hay; and
   means for moving said vertically oriented means along said tines for unloading the hay gathered thereon.

9. The apparatus as set forth in claim 8, wherein said means for moving said vertically oriented means comprises third hydraulic cylinder means substantially vertically oriented and pivotally coupled between said tine support means and said backstop.

10. The apparatus as set forth in claim 9, wherein said tine support frame comprises:
    first and second parallel, transverse frame means connected across said tines near the rear portions thereof;
    vertical frame means extending upwardly from said transverse support means;
    diagonal frame means extending from said second transverse frame means; and
    upper transverse frame means connecting the tops of said vertical frame means and said diagonal frame means.

11. The apparatus as set forth in claim 10, further comprising U-shaped linkage means pivotally coupled at one end thereof to said upper transverse frame means and at the other end of said third hydraulic cylinder means.

12. The apparatus as set forth in claim 11, wherein said means for moving said vertically oriented means further comprises:
    a pair of laterally spaced struts rigidly connected to and depending from said other end of said U-shaped linkage means; and
    a pair of V-shaped rods extending rearwardly from said backstop and pivotally mounted at their respective apexes to said pair of struts whereby actuation of said third hydraulic cylinder means causes lateral movement of said backstop along said tines.

13. The apparatus as set forth in claim 3, wherein said post includes a transverse frame member positioned at the top thereof and said support frame comprises a single frame member rigidly connected to the center portion of said transverse frame member while said auxiliary frame members include two frame members one pivotally mounted to each end of said transverse frame member so as to be substantially coplanar with said single frame member when in said ground-engaging position.

14. The apparatus as set forth in claim 13, wherein said support frame further comprises first and second support arms extending downwardly and rearwardly from the end of said single frame member, said wheel assembly being connected to the lower ends of said first and second support arms and including a second transverse frame member to the center of which is pivotally coupled said first hydraulic cylinder means.

15. The apparatus as set forth in claim 14, wherein said other end of said first hydraulic cylinder means is pivotally coupled to said two frame members at a position intermediate said end of said single frame member and said forward end of said auxiliary frame member.

16. The apparatus as set forth in claim 15, wherein said ends of said arms of said lift frame assembly are positioned adjacent said second transverse frame member in said ground-engaging position.

17. The apparatus as set forth in claim 1, further comprising quick-connect-disconnect ball joint means for coupling said post to said draw bar.

18. The apparatus as set forth in claim 17, wherein said ball joint means comprises:
   a ball connected to end extending upwardly from said draw bar;
   separable means extending downwardly from said post and defining a recess for receiving said ball therewithin; and
   means selectively positionable about said separable means for maintaining same together.

19. The apparatus as set forth in claim 18, wherein said separable means includes first and second bracket halves, each having a substantially semi-spherical recess for receiving said ball and a projection on the outer surface thereof for limiting downward movement of said selectively positionable means.

20. The apparatus as set forth in claim 19, wherein said first bracket half is integrally formed with said separable means extending downwardly from said post, and said second bracket half includes a grease fitting for allowing lubrication of said ball and means for facilitating separation of said halves when uncoupling.

21. The apparatus as set forth in claim 20, wherein said selectively positionable means comprises a split ring adapted to move vertically along said separable means.

22. The apparatus as set forth in claim 1, further comprising means connected to said post for supporting same on the ground when said frame is uncoupled from said tractor.

23. The apparatus as set forth in claim 22, wherein said means connected to said post comprises:
   a pair of semi-spherical sleeves each pivotally mounted at the lower ends thereof to said post and movable between a storage position concentric with said post and a ground-engaging position extending below said post.

24. The apparatus as set forth in claim 23, wherein said sleeves include means for retaining same in said storage position and said ground-engaging position.

25. The apparatus as set forth in claim 24, wherein said retaining means comprises a chain connected to one of said sleeves and means formed in the other of said sleeves for receiving an end of said chain in said ground-engaging position.

* * * * *